W. D. LUCE.
TEMPERATURE REGULATOR.
APPLICATION FILED APR. 17, 1914.
1,113,363.
Patented Oct. 13, 1914.
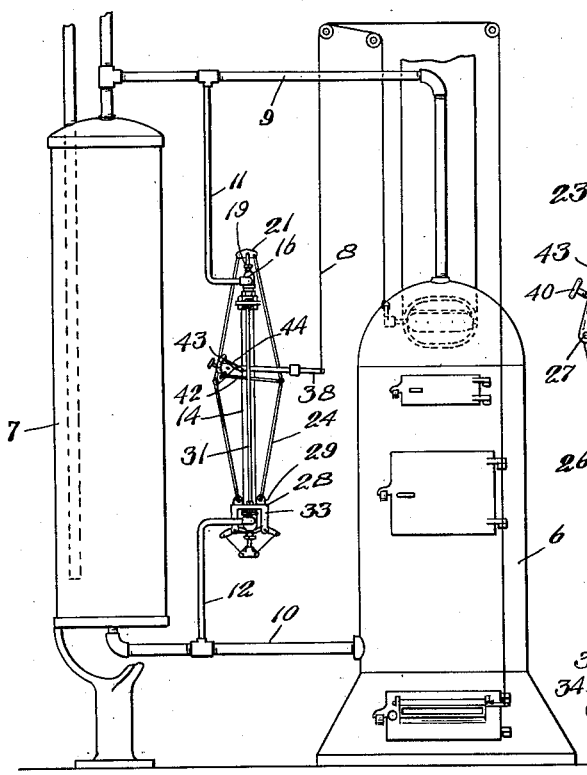
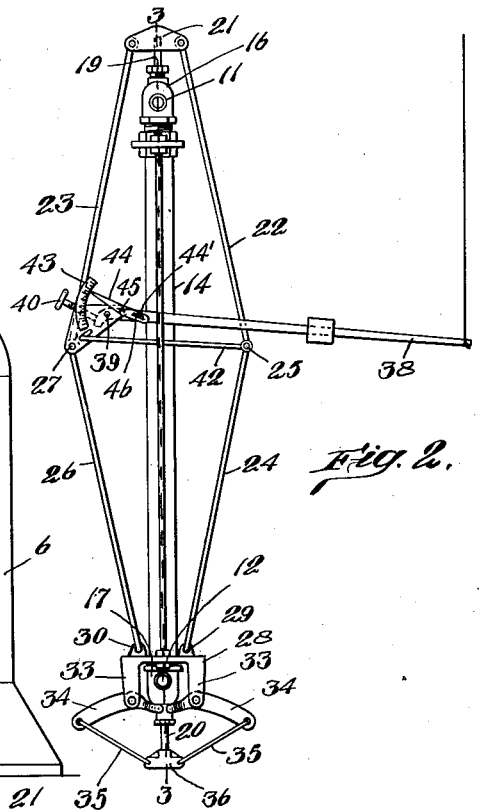
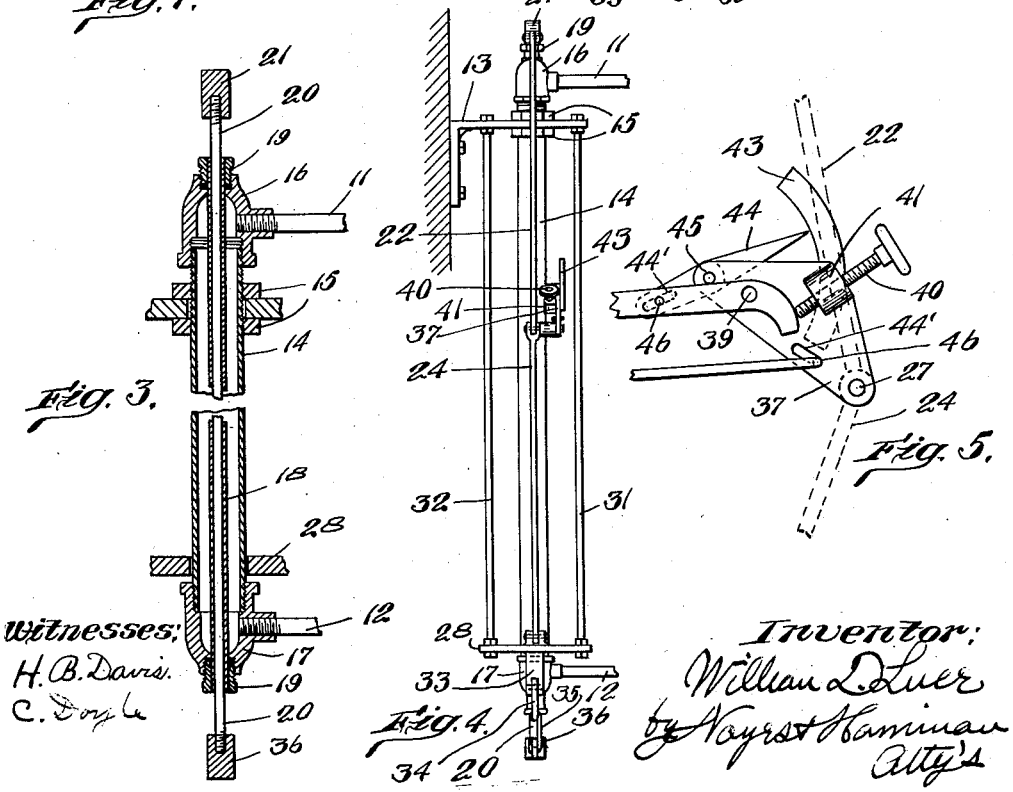
Inventor:
William D. Luce
by Voyrs & Harriman
Atty's
Witnesses:
H. B. Davis.
C. Doyle

UNITED STATES PATENT OFFICE.

WILLIAM D. LUCE, OF HAVERHILL, MASSACHUSETTS.

TEMPERATURE-REGULATOR.

1,113,363.  Specification of Letters Patent.  Patented Oct. 13, 1914.

Application filed April 17, 1914. Serial No. 832,447.

*To all whom it may concern:*

Be it known that I, WILLIAM D. LUCE, a citizen of the United States, residing at Haverhill, in the county of Essex and State of Massachusetts, have invented an Improvement in Temperature-Regulators, of which the following is a specification.

This invention relates to regulators for hot water heaters and more particularly to that type of regulators which are designed to maintain the water at a desired temperature, and are adapted to be operated by the expansion and contraction of material, the temperature of which is directly varied by variations in the temperature of the water.

Prior to my invention devices designed for this purpose have been produced, but, so far as I am aware, the length of the motion produced with the draft controlling mechanism, for a certain variation in temperature of the water has been so small as to make it difficult so to adjust the apparatus that the temperature will be maintained within a short range of any particular desired temperature.

The object of the invention is to provide a damper regulator of the above described type in which the damper controlling mechanism will be caused to move through a relatively great distance as compared with prior devices, for a certain variation in the temperature of the water, so that the water may be maintained at approximately one point, or the apparatus may be readily adjusted to maintain the temperature at practically any desired point.

A further object is to provide a simple and inexpensive device for this purpose, which has but few working parts and which is durable and is unlikely to get out of order.

I accomplish these objects by the means shown in the accompanying drawing, in which:

Figure 1, is a front elevation of a water-heating plant, provided with a regulator made according to my invention. Fig. 2, is a front elevation of the regulator. Fig. 3, is a central vertical section thereof on an enlarged scale taken on the line 3—3, of Fig. 2. Fig. 4, is a side elevation. Fig. 5, is a detail view of the adjusting and indicating mechanism which I employ.

In Fig. 1, of the drawing, a hot water heating system is illustrated, which comprises the furnace 6 connected to a tank 7, by means of the usual flow and return pipes 9 and 10, said furnace being provided with the usual dampers which are operated by a pull-chain 8, so that, when the chain is pulled downwardly the draft will be increased, and when it is released the draft will be checked. According to my invention I provide a regulator which is connected to the main circulating pipes 9 and 10 through the by-pass pipes 11 and 12, so that a portion of the circulating water flows through them at the temperature of the water in the main pipes. A bracket 13 is secured to the wall, and a pipe 14, preferably brass, or of some metal, having a high coefficient of expansion, is passed through said bracket 13 and rigidly clamped therein at its upper end by means of nuts 15. Caps 16 and 17 are connected to the upper and lower ends, respectively, of said pipe 14, the flow pipe 11 is connected to the upper cap 16, and the lower cap 17 is connected to the return pipe 12, so that the water will circulate through said pipes 11, 12 and 14. The return pipe 12 is jointed to permit longitudinal movement of pipe 14. A guide tube 18 is passed entirely through said pipe 14, and the caps 16 and 17, and a water-tight connection is formed between said tube and said caps by means of suitable stuffing boxes 19. An expansion rod 20 is fitted to slide freely in said tube 18. A yoke 21 is connected to the upper end of the rod 20, and a pair of links 22 and 23, are pivoted at their upper ends to said yoke 21, and, at their lower ends, are respectively connected, by pivots 25 and 27, to links 24 and 26, which are, respectively, pivoted to a support 28, by means of the pivots 29 and 30. A double toggle connection is thus provided between said yoke 21 and said support 28. Said support 28 is connected by tie-rods 31 and 32 to the bracket 13, lock nuts being provided on said tie rods, at opposite sides of said bracket and said support, so that the latter is rigidly held in one position with relation to the bracket 13. Said support 28 is provided with a pair of depending arms 33, in the lower end of which a pair of oppositely disposed levers 34 are pivoted with their inner ends adjacent each other. The tube 14 passes freely down through said support 28, and the lower end of its cap 17 is arranged to bear on the adjacent inner ends of the levers 34. The outer ends of said levers 34 are connected by links 35 to a yoke 36 on the lower end of the expansion rod 20. A plate 37 is pivotally mounted on the pivot 27, which connects the links 23 and 26, and an operating arm 38 is mounted on a pivot 39 arranged in said plate, said arm 38 having a short, downturned end portion 39, at one side of pivot 39, which is arranged to be engaged by an adjusting screw 40, threaded in a lug 41 on the plate 37. The opposite end of the said arm 38 is connected with the damper operating chain 8, and is suitably weighted, as illustrated. A link 42 is pivotally mounted at one end on the pivot 25, which connects the links 22 and 24, and, at the other end, is pivotally connected to the plate 37 at a point a short distance above the pivot 27, on which said plate is mounted. A dial 43 is mounted on the plate 37, and an indicator arm 44, is mounted on a pivot 45 on said plate 37, one end of said arm 44 being arranged to swing with relation to the graduated edge of the dial 43, and the other end having a longitudinal slot 44' therein, in which a pin 46, mounted on an arm 38, is located.

The operation of the device is as follows: Assuming that the draft is open and the arm 38 is in a low position:—as the temperature of the water is raised, the following action will take place. The water flowing through the pipe 14 will cause the latter to expand, and, as said pipe is rigidly held at its upper end, and passes freely through the support 28 at its lower end, it will be obvious that its longitudinal expansion will be downward, so that the cap 17, on its lower end, will be moved downwardly, such action causing such cap 17 to be pressed down on the inner ends of the levers 34 so that the opposite ends of said levers will be raised. The action of swinging up the outer ends of the levers 34 tends to straighten the toggle 35, thereby causing the rod 20 to be pushed upwardly in its tube 18. The tube 18 is of thin, heat-conducting material, so that the heat from the water will pass rapidly therethrough and will heat the rod 20, which is made of brass, or some material, having a high coefficient of expansion. Inasmuch as the levers 34 not only act to resist the downward expansion of the rod, but are also effective in causing said rod 20 to be pushed upwardly, it will follow that, when the rod 20 expands, the yoke 21 on its upper end will be moved upwardly both through the expansion of said rod 20, and through the action of the levers 34, due to the expansion of the pipe 14. It has already been noted that the support 28 is rigidly held by the rods 31 and 32, so that, when the yoke 21 is moved upwardly, as the support 28 can not be drawn upwardly by the toggles which connect the same to said yoke, the result will be to straighten toggles, causing the pivots 25 and 27 to be moved toward each other. As the link 42, which is connected to the middle joint, or pivot 25, is connected to the plate 37 at one side of its pivot 27, when the toggles are straightened, the rod 42 will be pushed longitudinally toward the plate 37, causing the latter to be swung upward on its pivot 27. Inasmuch as the damper arm 38 is held from swinging downward by the stop-screw 40, it will be apparent that, as the plate 37 is swung upwardly on the pivot 27, said arm 38 will also be swung upwardly, thus releasing the chain and permitting the draft controlling means to operate to check the fire, suitable actuating means therefor being provided. When the temperature of the water reaches the desired point, the parts will be held in a position to cause this temperature to be maintained. If the temperature should become lowered, the opposite action already described will take place, the movement being reversed, permitting the lever 38 to be lowered by its weight and causing the chain to be pulled, so that the draft will be increased in a manner which will be obvious. If it is desired to increase or diminish the temperature at which the water shall be automatically maintained, it is merely necessary to adjust the stop screw 40 accordingly. That is, if the screw 40 is turned inwardly the arm 38 will be swung on its pivot 39, raising the opposite end thereof so that the draft will be checked when the water reaches a lower temperature than that at which it was previously maintained and, in like manner, if the temperature of the water is to be maintained at a higher point, it is merely necessary to turn the screw 40 outwardly, so that the lever 38 will be lowered with relation to the apparatus when the arm 38 is adjusted upwardly the dial finger 44 will be swung downward with relation to the dial 43, and vice versa.

With the above described construction, a wide range of movement of the end of the arm 38 is secured by a comparatively small variation in the temperature of the water which circulates through the system so that the draft will be varied to a substantial extent when such slight variation of the temperature occurs. Moreover the apparatus may be adjusted through a wide range enabling it to be accurately set to maintain the water at practically any desired temperature.

I claim:—

1. A temperature regulator for a circulating fluid comprising an expansion pipe rigidly supported at one end only and having pipe connections at its ends to conduct the circulating fluid therethrough, an expansion-rod extending through said pipe in central longitudinal alinement therein, a pair of levers oppositely disposed and mounted at opposite sides of said pipe and having their adjacent ends in engagement with the free end of said pipe, a pair of links respectively connecting the opposite ends of said levers and the adjacent end of said rod, to cause said pipe, as it expands in one direction, to move said rod in the opposite direction, and operating devices engaging the opposite end of said rod, substantially as described.

2. A temperature regulator comprising a support, an actuator arranged to be moved with relation to said support according to variations in temperature of a fluid, a toggle connecting said actuator and said support, a pivoted support, an operating arm pivotally mounted on said pivoted support, connections between said pivoted support and said toggle to cause the support to be swung on its pivot when the toggle is straightened, and an adjusting screw arranged to support said arm and to move in different positions relative to said support, substantially as described.

3. A temperature regulator comprising an upper and a lower support, an expansion pipe rigidly connected to said upper support and extending downward to said lower support, an expansion rod disposed within and extending throughout the length of said pipe, a lever mounted on said lower support and arranged to be actuated by said pipe on expansion thereof and to engage said rod to move the same upwardly, a pair of toggles pivoted at their upper ends to the upper end of said rod and at their lower ends to said lower support, a damper operating lever pivoted to the middle portion of one of said toggles, and a link connected to the middle portion of the other toggle and to said lever at one side of its pivot, substantially as described.

4. A temperature regulator comprising a support, an actuator arranged to be moved with relation to said support according to variations in temperature of a fluid, a pair of toggles connecting said actuator, and said support, and so arranged that, as said toggles are straightened, their middle pivots will be moved toward each other, an arm pivotally mounted on the pivot of one of said toggles, a link mounted on the middle pivot of the other toggle and pivoted to said arm at one side of the pivot on which said arm is mounted, whereby said arm will be swung on its pivot as the said middle joints are moved toward and from each other by said actuator and operating devices arranged to be engaged by said arm, substantially as described.

In testimony whereof, I have signed my name to this specification, in the presence of two subscribing witnesses.

WILLIAM D. LUCE.

Witnesses:
L. H. HARRIMAN,
RALPH E. GARDNER.